(12) United States Patent
Maryamchik et al.

(10) Patent No.: US 9,829,217 B2
(45) Date of Patent: Nov. 28, 2017

(54) CONCENTRATED SOLAR POWER SOLIDS-BASED SYSTEM

(71) Applicant: Babcock & Wilcox Power Generation Group, Inc., Barberton, OH (US)

(72) Inventors: Mikhail Maryamchik, Fairlawn, OH (US); David L Kraft, Massillon, OH (US); Shengteng Hu, Copley, OH (US); Andrew J Mackrory, Clinton, OH (US); Bartev B Sakadjian, North Canton, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 843 days.

(21) Appl. No.: 14/250,160

(22) Filed: Apr. 10, 2014

(65) Prior Publication Data

US 2014/0311479 A1    Oct. 23, 2014

Related U.S. Application Data

(60) Provisional application No. 61/814,614, filed on Apr. 22, 2013.

(51) Int. Cl.
| | |
|---|---|
| F24J 2/46 | (2006.01) |
| F03G 6/06 | (2006.01) |
| F24J 2/34 | (2006.01) |
| F24J 2/07 | (2006.01) |
| F28D 13/00 | (2006.01) |

(52) U.S. Cl.
CPC ............ *F24J 2/4649* (2013.01); *F03G 6/067* (2013.01); *F24J 2/07* (2013.01); *F24J 2/34* (2013.01); *F28D 13/00* (2013.01); *Y02E 10/41* (2013.01); *Y02E 10/46* (2013.01)

(58) Field of Classification Search
CPC ...... F24J 2/4649; F24J 2/07; F24J 2/34; F03G 6/067; F28D 13/00; Y02E 10/46; Y02E 10/41
USPC ................... 126/617, 609, 620, 683–684
See application file for complete search history.

(56) References Cited

U.S. PATENT DOCUMENTS

| | | | |
|---|---|---|---|
| 3,627,036 A | 12/1971 | Gilbert | |
| 3,908,632 A | 9/1975 | Poulsen | |
| 4,041,318 A * | 8/1977 | Poulsen | F21K 2/00 126/632 |
| 4,116,222 A | 9/1978 | Seifried | |
| 4,290,779 A * | 9/1981 | Frosch | C10J 3/56 126/569 |

(Continued)

FOREIGN PATENT DOCUMENTS

WO    WO 2012/052661    *    4/2012    ............ C10J 3/46

*Primary Examiner* — Hoang Nguyen
(74) *Attorney, Agent, or Firm* — Michael J. Seymour (57) ABSTRACT

A solar power system comprises a solar receiver, a heated solids storage tank downstream of the solar receiver, a fluidized bed heat exchanger downstream of the heated solids storage tank, and means for transporting solid particles from the fluidized bed heat exchanger to a cold solids storage tank upstream of the solar receiver. The fluidized bed heat exchanger includes a first fluidized bed and a second fluidized bed. Solid particles flow through the fluidized bed heat exchanger and transfer heat energy to heating surfaces in the two fluidized beds. The system permits the solid particles to absorb more energy and permits a constant energy output from the fluidized bed heat exchanger.

17 Claims, 6 Drawing Sheets

(56) References Cited

U.S. PATENT DOCUMENTS

| | | | | |
|---|---|---|---|---|
| 4,338,919 A | * | 7/1982 | Hwang | F24J 2/23 |
| | | | | 126/640 |
| 4,423,558 A | * | 1/1984 | Meunier | B01J 8/04 |
| | | | | 34/210 |
| 4,582,590 A | * | 4/1986 | Qader | B01J 19/127 |
| | | | | 208/407 |
| 4,867,079 A | * | 9/1989 | Shang | F23C 10/002 |
| | | | | 110/245 |
| 6,701,711 B1 | * | 3/2004 | Litwin | F02C 1/05 |
| | | | | 60/641.11 |
| 6,712,069 B1 | | 3/2004 | Spangler | |
| 6,872,378 B2 | | 3/2005 | Weimer et al. | |
| 7,033,570 B2 | | 4/2006 | Weimer et al. | |
| 7,449,158 B2 | | 11/2008 | Haueter et al. | |
| 7,475,543 B2 | | 1/2009 | Martin | |
| 8,960,182 B2 | * | 2/2015 | Magaldi | F24J 2/07 |
| | | | | 126/609 |
| 2004/0112374 A1 | * | 6/2004 | Litwin | F24J 2/07 |
| | | | | 126/680 |
| 2011/0193026 A1 | | 8/2011 | Weimer et al. | |
| 2012/0080168 A1 | * | 4/2012 | Hemrle | F01K 3/12 |
| | | | | 165/104.19 |
| 2013/0042857 A1 | * | 2/2013 | Magaldi | F24J 2/07 |
| | | | | 126/617 |
| 2013/0047611 A1 | * | 2/2013 | Bruckner | F01K 3/18 |
| | | | | 60/641.15 |
| 2013/0255667 A1 | | 10/2013 | Ma et al. | |
| 2013/0257056 A1 | * | 10/2013 | Ma | F03G 6/065 |
| | | | | 290/52 |

* cited by examiner

CONCENTRATED SOLAR POWER SOLIDS-BASED SYSTEM

RELATED APPLICATION DATA

This application claims the benefit of U.S. Provisional Application No. 61/814,614 filed Apr. 22, 2013 and titled "CONCENTRATED SOLAR POWER SOLIDS-BASED SYSTEM". U.S. Provisional Application No. 61/814,614 filed Apr. 22, 2013 and titled "CONCENTRATED SOLAR POWER SOLIDS-BASED SYSTEM" is hereby incorporated by reference in its entirety into the specification of this application.

BACKGROUND

The present disclosure relates broadly to the field of solar power generation. More particularly, this disclosure relates to systems by which solar energy is captured in solid particles and transferred to a heat exchanger to produce power. These solar receiver designs can be used with Concentrated Solar Tower technology, also known as Concentrated Solar Power (CSP) technology, to harness the sun's energy to produce "green" electricity.

Concentrated solar power technology has been known for a substantial time. Its uses and applications stretch from heating and cooling to chemical processing to power production. Generally, solar energy is captured in a heat capture medium within a closed loop and transferred via a heat exchanger to a second medium in a second separate loop where the energy is used.

U.S. Pat. No. 3,908,632 describes the use of a gaseous carrier for transporting solid particles through a solar receiver for absorbing solar radiation, and transferring that heat energy to water or other heat exchange medium. When solid particles are used as a heat capture medium and are transported using a gaseous carrier (e.g. air), the gaseous carrier will inevitably be heated as well through convection heat exchange with the particles. The amount of heat exchange will be largely due to the high concentration, small size, large reaction surface, and high heat transfer coefficient of the particles. If the energy in the gaseous carrier is not also transferred at the heat exchanger to the second medium, the efficiency of the total solar energy capture cycle decreases due to this heat loss. The maximum temperature that the solid particles can attain in the solar receiver becomes limited by the maximum temperature acceptable to the blower that is circulating the gaseous carrier, rather than the maximum temperature acceptable to the particles themselves.

U.S. Pat. No. 4,338,919 describes the use of a mechanical apparatus for transporting solid particles through a solar receiver. However, this patent does not decouple the solids flow rate through the solar receiver with the solids flow rate through the fluidized bed heat exchanger.

In addition, solar activity is variable, meaning that a constant energy output from the heat exchanger cannot be obtained unless some sort of storage for the heat capture medium is provided.

It would be desirable to provide a solar power system that can provide increased system efficiency and flexibility.

BRIEF DESCRIPTION

The present disclosure relates to a solar power system that uses solid particles to capture solar energy and then transfers that captured energy to one or more fluids using a set of fluidized beds. A cold solids storage tank, a means for metering solid particles from the cold solids storage tank to the solar receiver, and a heated solids storage tank are used to decouple solids flow rates through the solar receiver and flow through the fluidized bed heat exchanger. This allows the solids flow rate through the solar receiver to be synchronized with solar activity and thus maintain a constant temperature of the heated particles exiting the solar receiver. Otherwise, the temperature of the particles exiting the solar receiver will begin declining immediately upon reducing solar activity, affecting the temperature of the solids being stored, and thus affecting the future system output and efficiency. The latter would require maximizing solids temperature leaving the solar receiver within the limits imposed by the properties of the solids and the integrity requirements of the structural parts.

Disclosed in various embodiments herein is a concentrated solar power solids-based system, comprising: a solar receiver; a heated solids storage tank downstream of and connected to the solar receiver; a fluidized bed heat exchanger downstream of the heated solids storage tank; means for feeding heated solid particles from the heated solids storage tank to the fluidized bed heat exchanger; means for transporting solid particles from the fluidized bed heat exchanger to a cold solids storage tank that is located downstream of the fluidized bed heat exchanger; and means for transporting and metering cold solid particles from the cold solids storage tank to the solar receiver; wherein the fluidized bed heat exchanger includes at least a first fluidized bed, a first heating surface located in the first fluidized bed, a second fluidized bed, and a second heating surface located in the second fluidized bed.

The fluidizing medium flow to the first fluidized bed and the second fluidized bed can be independently controlled.

The solar receiver may include a plurality of heating areas that can be fed separately by the means for transporting and metering cold solid particles from the cold solids storage tank to the solar receiver.

The first fluidized bed and the second fluidized bed may be located in parallel particle flow streams within the fluidized bed heat exchanger, or may be connected in series in a single particle flow stream within the fluidized bed heat exchanger.

The freeboard height of each fluidized bed is generally not less than a transport disengaging height of each fluidized bed.

In some embodiments, the first heating surface and the second heating surface are part of one or more fluid transport conduits, and the fluid flowing through the one or more fluid transport conduits is independently selected from water, steam, a steam-water mixture, air, carbon dioxide, helium, and nitrogen.

Solid particles may travel through the solar receiver and through the heated solids storage tank to the fluidized bed heat exchanger by gravity.

The means for feeding heated solid particles from the heated solids storage tank to the fluidized bed heat exchanger may be non-mechanical.

The means for feeding heated solid particles from the heated solids storage tank to the fluidized bed heat exchanger can include a safety chamber, wherein solid particles can only pass through the safety chamber when in a fluidized state.

The means for transporting solid particles from the fluidized bed heat exchanger to the cold solids storage tank may be a mechanical carrier or gravity.

The means for transporting solid particles from the fluidized bed heat exchanger to the cold solids storage tank may comprise a pneumatic transport means that uses a gaseous carrier for lifting solid particles to the cold solids storage tank. The pneumatic transport means can include a separator located above the cold solids storage tank to separate the gaseous carrier from the solid particles, the solid particles traveling by gravity from the separator to the cold solids storage tank.

The solar power system may further comprise an intermediate storage tank downstream of the fluidized bed heat exchanger and upstream of the means for transporting solid particles from the fluidized bed heat exchanger to the cold solids storage tank. The solid particles can be transported from the fluidized bed heat exchanger to the intermediate storage tank by gravity.

The first heating surface and the second heating surface may be part of one common fluid transport conduit, or the first heating surface and the second heating surface may be part of two different fluid transport conduits.

Also disclosed herein are methods of heating a working fluid using solar energy, comprising: passing cold particles through a solar receiver by gravity to capture solar energy and obtain heated particles, the heated particles traveling by gravity into and through a heated solids storage tank; sending the heated particles from the heated solids storage tank to a fluidized bed heat exchanger; fluidizing the heated particles and sending the fluidized particles to at least a first fluidized bed and a second fluidized bed; transferring heat from the fluidized particles in the first fluidized bed to a working fluid on the opposite side of a first heating surface located in the first fluidized bed and obtaining cooled particles; transferring heat from the fluidized particles in the second fluidized bed to a working fluid on the opposite side of a second heating surface located in the second fluidized bed and obtaining cooled particles; and transporting the cooled particles to a cold solids storage tank downstream of the fluidized bed heat exchanger and connected to the solar receiver.

The heated particles from the heated solids storage tank may enter a safety chamber prior to entering one of the fluidized beds, wherein the heated particles can only pass through the safety chamber when in a fluidized state.

The cooled particles may travel through an intermediate storage tank downstream of the fluidized bed heat exchanger prior to being transported to the cold solids storage tank.

The cooled particles may travel from the fluidized bed heat exchanger to the cold solids storage tank via a pneumatic transport means that uses a gaseous carrier for lifting the cooled particles to a separator located above the cold solids storage tank, wherein the gaseous carrier is separated from the cooled particles, the cooled particles traveling by gravity from the separator to the cold solids storage tank.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of."

Numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absoluter values of the two endpoints. For example, the expression "from about 2 to about 4" also discloses the range "from 2 to 4."

It should be noted that many of the terms used herein are relative terms. For example, the terms "interior" and "exterior" are relative to a structure that separates these two locations, with the interior being surrounded by the structure. The terms "upstream" and "downstream" are relative to the direction in which a material flows through various components, i.e. the material flows through an upstream component prior to flowing through the downstream component. It should be recognized that for components that are located in a recirculating loop, it is possible for a first component to be both upstream of and downstream of a second component. The terms "heated" and "cold" are also relative terms, i.e. heated particles have a higher temperature than cold particles, but this should not be construed as requiring for example that the cold particles have a temperature below a specific value.

The terms "top" and "bottom" are used to refer to surfaces where the top is always higher than the bottom relative to an absolute reference, i.e. the surface of the earth. The terms "above" and "below" are used to refer to the location of two structures relative to an absolute reference. For example, when the first component is located above a second component, this means the first component will always be higher than the second component relative to the surface of the earth.

As used herein, the term "supercritical" refers to a fluid that is at a temperature above its critical temperature and at a pressure above its critical pressure. For example, the critical temperature of water is 374.15° C., and the critical pressure of water is 3200.1 psia (22.1 MPa). A fluid at a temperature that is above its boiling point at a given pressure but is below its critical pressure is considered to be "superheated" but "subcritical". A superheated fluid can be cooled (i.e. transfer energy) without changing its phase.

As used herein, the term "connected" may refer to a direct connection or a fluid connection (i.e. a connection wherein one or more additional intermediate components are located between the connected components).

To the extent that explanations of certain terminology or principles of the solar receiver, boiler and/or steam generator arts may be necessary to understand the present disclosure, the reader is referred to *Steam/its generation and use*, 40th Edition, Stultz and Kitto, Eds., Copyright 1992, The Babcock & Wilcox Company, and to *Steam/its generation and use*, 41st Edition, Kitto and Stultz, Eds., Copyright 2005, The Babcock & Wilcox Company, the texts of which are hereby incorporated by reference as though fully set forth herein.

The present disclosure relates to a solar power system that uses solid particles to capture solar energy and transfer that energy to one or more working fluids. Exemplary working fluids include water, steam, a steam/water mixture, air, carbon dioxide, helium, or nitrogen. The present system addresses the shortcomings of prior systems.

Figure 1:
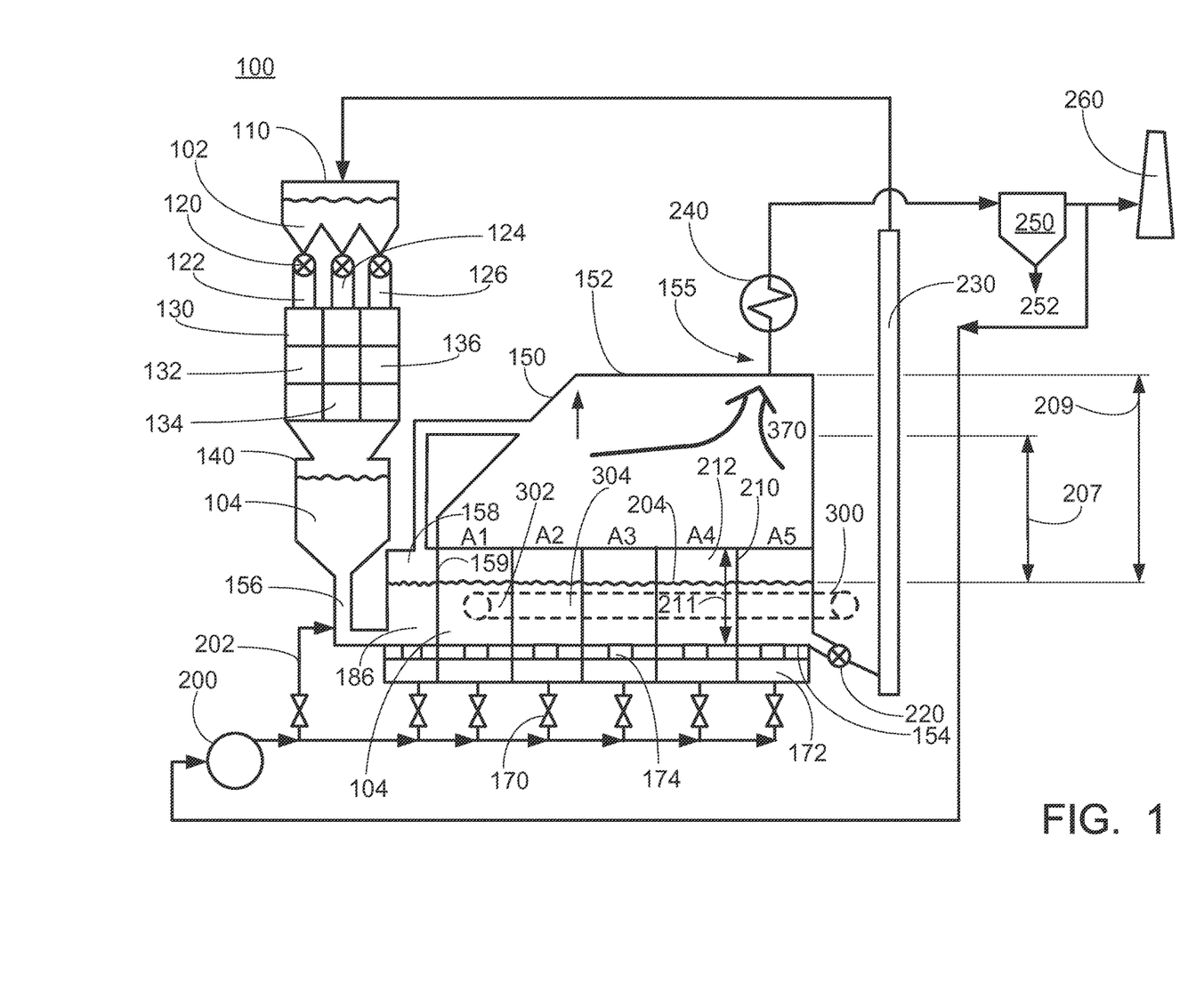
FIG. 1 is a side-view schematic diagram of a first exemplary embodiment of the solar power system, and is not to scale.

First, referring to FIG. 1, a cold solids storage tank 110, a heated solids storage tank 140, and metering means 120, 156 are introduced to decouple the solids flow rates through various parts of the system. The metering means permits the solids flow rate through the solar receiver 130 to be synchronized with the solar activity, thus maintaining a constant temperature for solid particles leaving the solar receiver. In the prior art, a constant flow rate was maintained, and the temperature of the particles leaving the solar receiver was varied instead.

Synchronizing the solids flow rate through the solar receiver with the solar activity is especially important for maximizing the system efficiency. The system efficiency is enhanced by maximizing the temperature of the solid particles leaving the solar receiver within the limits imposed by the particle properties and structural parts integrity requirements. Since different areas of the solar receiver may have different solar radiation exposure, it can be beneficial to have the ability to meter solid particles separately to different areas of the solar receiver.

A means 156 for metering heated solid particles to the fluidized bed heat exchanger 150 is introduced to constantly match power demand for the system. The metering means can be of a mechanical type (such as a conical valve or others known to those skilled in the art) or a non-mechanical type (such as an L-valve or others known to those skilled in the art). One criterion for selecting a particular metering means is its ability to accommodate the maximum temperature of the heated solid particles.

Feeding heated solid particles from their storage tank 140 to the fluidized bed heat exchanger 150 by gravity removes limitations on their maximum temperature that could be imposed by mechanical means of transporting the solids and eliminates potential heat losses associated with a gaseous carrier for pneumatic transportation. Thus, it is desirable (though not required) to place the heated solids storage tank at a higher elevation relative to the fluidized bed heat exchanger, allowing gravity feed to occur.

Next, maximizing the system efficiency for power production requires maximizing the temperature of the heat exchange medium that is used in a power production cycle. The maximum temperature of the heat exchange medium is limited by the maximum allowable temperature of the heating surface through which the heat is transferred. The latter should allow for a margin between the average and local upset temperatures of the heat exchange medium. Reducing the difference between these temperatures by controlling the heat absorption of parts of the heating surface permits an increase in the average temperature of the heat exchange medium, thus maximizing the cycle efficiency.

As seen in FIGS. 3-6, this can be done by using several fluidized beds A1-A5, B1-B5, C1-C5, D1-D4 in the fluidized bed heat exchanger. The heat absorption of the heating surface in each fluidized bed can be monitored and controlled separately, thus reducing the margin between the average and maximum upset temperatures in each fluidized bed.

Figure 4:
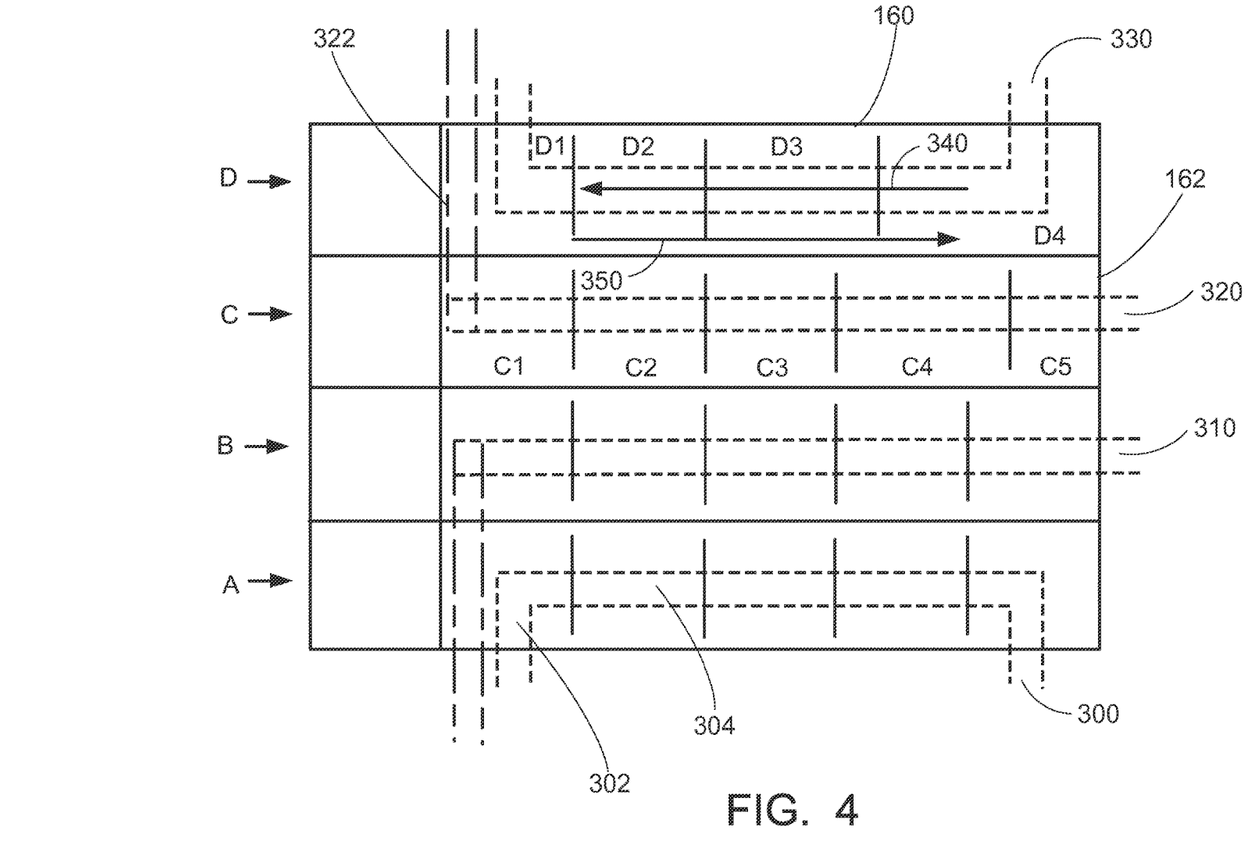
FIG. 4 is a plan view of the interior layout of FIG. 3, with the heating surfaces (tubes) included to show counter-current flow.

As seen in FIG. 4, directing the solid particles through the beds in a counter-current flow 350 to the flow 340 of the working fluid through the corresponding heating surfaces will also increase the overall mean temperature differential between the solid particles and the working fluid, allowing reduction of the total heating surface area for a given amount of heat duty. Thus, it can be beneficial to connect several fluidized bed in series relative to the solid particles flow. For example, beds C1-C5 are connected in series with each other, as are beds D1-D4.

Solids flow through the fluidized bed heat exchanger can also be split into two or more parallel streams, each or some of those streams including fluidized beds connected in series. Splitting the solids flow in parallel streams allows for tighter match of the solid particles and the relevant working fluid, thus reducing the margin between the average and maximum upset temperatures of the working fluid. In FIG. 4, flow streams A, B, C, and D are parallel to each other. Each stream includes fluidized beds connected in series.

While these flow streams A, B, C, D are shown as being split after the storage tank 140, the splitting can occur anywhere within the fluidized bed heat exchanger. For example, a given flow stream could be split into different parallel paths after passing through a fluidized bed. Two or more of the parallel flow streams may also be recombined into a single stream within the fluidized bed heat exchanger.

This parallel flow can be useful, for example, when using a Rankine cycle for power production. There, water spray is a prevalent means of controlling superheated steam temperature. However, if a Rankine cycle with reheat (RH) is utilized, spraying water into the RH steam reduces the cycle efficiency because the steam generated from this water does not pass through the high pressure turbine. Splitting the solids flow in parallel can be used for RH steam temperature control by controlling the amount of solid particles flowing though the path containing a reheating heating surface. The solid particles that do not flow through the RH path would not be affected by such a water spray. Therefore, splitting the solids flow in parallel allows steam temperature control flexibility in a given flow stream without completely sacrificing the overall cycle efficiency.

The power systems of the present disclosure can employ multiple cycles simultaneously for power production and/or other needs such as heating, chemical processing, etc. For example, a Brayton cycle with supercritical carbon dioxide as a working medium could be used along with a Rankine cycle, both cycles making up a combined cycle where the Brayton cycle covers the higher temperature part and the Rankine cycle covers the lower temperature part of the combined cycle, thus improving overall cycle efficiency. The same system could also include heating surfaces for generating steam for heating purposes and another one for heating some chemical reagents.

If heating surfaces of different types (e.g. superheat, reheat, economizer, etc.) are located in the same fluidized bed, controlling the heat absorption of one type could adversely affect the other types. Thus, it is contemplated that there is only one type of heating surface or working fluid in a given fluidized bed.

Depending on the specifics of the system, it may be beneficial to split the solid particles into parallel flow streams according to the cycles employed, e.g. one solids path for a Brayton cycle, another solids path for a Rankine cycle, and a third path for a heating cycle. In some cases, such as when only low temperatures are acceptable for heating certain chemical reagents, fluid transportation conduits for those chemical reagents could be placed in the fluidized beds at the end of the parallel flow streams.

The superficial gas velocity of a given fluidized bed is an important parameter of its performance. Its minimum value is limited by conditions of reliable fluidization throughout the bed area. Its increase beyond the minimum value increases the potential for erosion of the heating surfaces and carryover of the bed material from the heat exchanger. Its change within the acceptable limits is important as it affects the heat transfer rate. Changing power output and other operating parameters will affect the solids temperature in a given fluidized bed, and hence will affect the specific volume of the fluidizing medium (e.g. the air) and its superficial velocity at a given mass flow rate of the medium. Thus, it is beneficial to independently control flow of the fluidizing medium to each fluidized bed based on monitored conditions. Referring back to FIG. 1, each fluidized bed A1-A5 has its own control valve 170, windbox 172, and distributor 174 to promote even air flow through the bed.

For low-velocity bubbling fluidized beds (BFBs), the terminal velocity of an average particle far exceeds the superficial gas velocity of the bed. In other words, the average particle cannot be entrained by the gas flow leaving the bed. However, when the bubbles erupt at the bed surface, particles can be splashed far above the surface. If the exit 155 from the heat exchanger is located close to the bed surface 204, a large quantity of solids could be carried out from the heat exchanger with the gas. They would have to be collected and recycled back thus requiring extra power consumption and, possibly, more system maintenance associated with increased erosion.

Increasing the height of the fluidizing gas exit point(s) above the bed surface reduces the amount of solids entrainment. The height at which the entrainment becomes approximately constant is known as the transport disengagement height. Primary factors affecting the height are particle size distribution and density, superficial velocity and properties of the fluidizing medium. The height can be evaluated during the system design. It is beneficial to have a freeboard height 209 (between the bed surface and the exit) of not less than the transport disengaging height 207.

When the heated solids storage tank is located at an elevation allowing solids gravity feed to the heat exchanger, a malfunction of the feed system may potentially result in flooding of the heat exchanger with the heated solid particles. Such an event can be prevented by installing a safety section into the means 156 for feeding solids from the heated solids storage tank to the fluidized bed heat exchanger. The section will contain a chamber 158, through which solid particles can only pass when in a fluidized state. This safety section provides a passive safety means that prevents unintended solids throughput into the heat exchanger 150.

To enable expedient synchronization of the solids flow rate through the solar receiver with the solar activity, the cooled solids storage tank 110 should be in close proximity to the solar receiver 130. Since the solar receiver is elevated to receive solar radiation reflected by mirrors (e.g. heliostats) covering a large area, the cold solids storage tank 110 is elevated as well. The solids feed from the cold solids storage tank 110 to the solar receiver 130 and further to the heated solids storage tank 140 and to the fluidized heat exchanger 150 is preferably by gravity that defines the relative elevation of these parts of the system. Thus, in some embodiments the cold solids storage tank 110 is the highest part of the system, and the heat exchanger 150 is the lowest part of the system. As a result, solid particles leaving the heat exchanger 150 generally have to be lifted to the cold solids storage tank 110.

The lifting can be accomplished by a mechanical means, e.g. by a screw or a bucket elevator or a conveyor or other means known to those skilled in the art. The lifting can also be accomplished by a pneumatic transport means utilizing a gaseous carrier, e.g. air, also well known to those skilled in the art. The selection of the lifting means can be project-specific. The advantages of the mechanical means include lower power consumption; those of the pneumatic means include simplicity and lower maintenance potential. Space requirements and equipment availability are among other factors to be considered.

Figure 2:
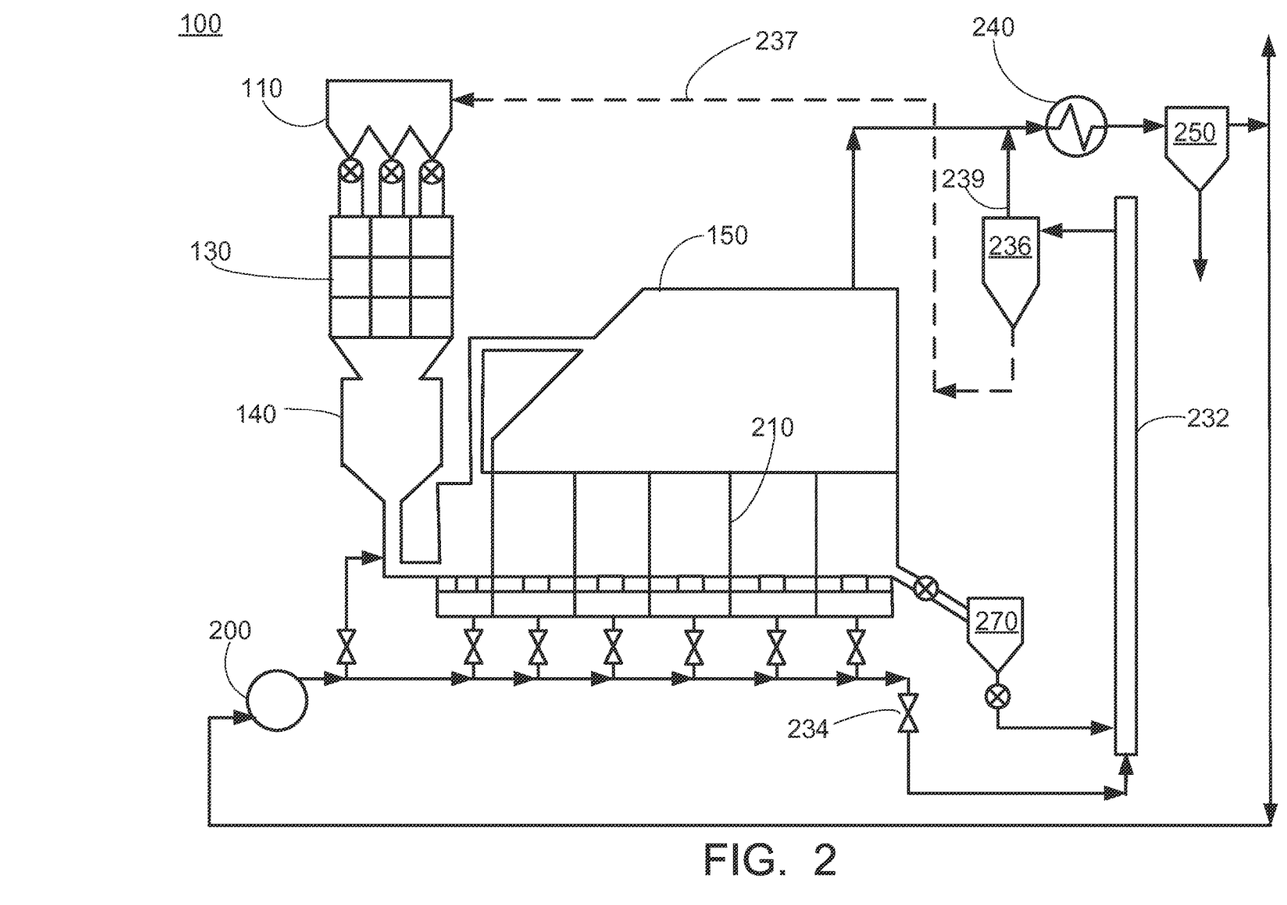
FIG. 2 is a side-view schematic diagram of a second exemplary embodiment of the solar power system, and shows additional components, and is not to scale.

Referring now to FIG. 2, if a pneumatic lifting means 232 is used, a separator 236 can be provided at the top of the lifting means for separating the solid particles from the gaseous carrier. The solid particles will be further directed to the cold solids storage tank 110 (reference numeral 237). The flow of the gaseous carrier (reference numeral 239) may be combined with the flow of the fluidizing medium leaving the heat exchanger 150 and the combined flow directed through a cooler 240 and further through a fine solids collecting device 250, e.g. a baghouse.

Cooling the gaseous flow upstream of the collecting device 250 is beneficial as long as the heat absorbed from the gas can be utilized. If this is not the case and the gas temperature is acceptable for the solids collecting device, the cooler 240 can be omitted. The sensitive heat of the gas will not be lost if after the collecting device, the gas is directed to fan means 200 and reused as the fluidizing medium in the heat exchanger 150. This, however, may result in a higher power consumption of the fan means and can be subject to system design optimization.

The size and weight of the cold solids storage tank can be significant. Placing such a storage tank at the top of the system can increase structural support requirements, resulting in substantial added cost. Referring to FIG. 2, the cost can be reduced by utilizing an intermediate storage tank 270 for cooled solid particles located at or below the heat exchanger 150. Solids transport from the heat exchanger 150 to this intermediate storage tank 270 again is preferentially accomplished by gravity. The intermediate storage tank can contain the bulk of the cooled solids, i.e. the intermediate storage tank 270 can have a greater volume than the cold solids storage tank 110. The capacity of the cold solids storage tank 110 would be limited to the minimum required to expediently match changes in solar activity with the solids flow rate to the receiver 130. The system would be designed to keep the cold solids storage tank 110 filled within certain margins.

As previously mentioned, the present disclosure relates to a solar power system that uses solid particles to capture solar energy and transfer that energy to one or more working fluids. The solar power system can be used in conjunction with a boiler for generating electricity.

The solid particles may have an average particle diameter of from about 50 micrometers (μm) to about 200 μm, including from about 100 μm to about 200 μm. The particles may be made of silicon dioxide (i.e. silica or $SiO_2$), or a crushed refractory such as $Al_2O_3$, or another granular material. The particles should be capable of withstanding high temperatures. It should be noted that at this particle size, the thermal conductivity of the material is not of great importance.

FIG. 1 is a schematic diagram showing a side view of a first exemplary embodiment of the solar power system 100. The solar power system 100 includes a solar receiver 130, in which relatively cool solid particles are exposed to sunlight and absorb solar energy, becoming heated solid particles. The solar receiver is generally placed at an elevation to be exposed to reflected sunlight from heliostats that cover a ground area adequate to support the power output of the system. The solar receiver is generally elevated above ground level as needed to ensure adequate exposure to sunlight from the most distant heliostats.

A cold solids storage tank 110 is located upstream of the solar receiver, and is connected to the solar receiver. Cold particles 102 are depicted within. The cold solids storage tank is located close to the solar receiver, so that the solids flow rate through the solar receiver can be synchronized with solar activity. In specific embodiments, the cold solids storage tank 110 is located above the solar receiver 130. This also permits the cooled solid particles to be fed to the solar receiver by gravity. A means 120 for transporting and metering the cold solids is located between the cold solids storage tank 110 and the solar receiver 130. The means 120 is used to both control the rate at which the cold solids are fed to the solar receiver, and to move the cold solids to the solar receiver.

The solar receiver 130 may include a plurality of heating areas. Different areas of the solar receiver may receive different amounts of solar radiation exposure, and individually controlling the feed rate of the solid particles to each area maximizes the heat absorption in the area. This is illustrated here, with the solar receiver being divided into three heating areas 132, 134, 136, each heating area receiving a separate flow 122, 124, 126 from the cold solids storage tank 110. The solar receiver could operate by, for example, sending a smaller quantity of particles to the heating area receiving less solar radiation. A larger quantity of particles could be sent to the heating area receiving more solar radiation.

A heated solids storage tank 140 is located below (i.e. downstream of) the solar receiver 130, and is connected to the solar receiver. Heated solid particles 104 are illustrated within. The heated solids storage tank is located below the solar receiver, so that the solid particles can travel into the heated solids storage tank by gravity. This removes limitations on the maximum temperature of the solid particles that could be imposed by the transport means. For example, mechanical transport means such as belt conveyors have a maximum allowable temperature before the belt begins to melt. As another example, a pneumatic transport device such as a gaseous carrier would absorb heat, causing loss of energy. The heated solids storage tank is insulated to minimize heat losses for enhancing system performance.

A fluidized bed heat exchanger 150 is located downstream of the heated solids storage tank 140, and is connected to the heated solids storage tank. The heated solids storage tank 140 is elevated relative to the fluidized bed heat exchanger 150, permitting the solid particles to transfer by gravity.

The fluidized bed heat exchanger includes at least two fluidized beds, a first fluidized bed and a second fluidized bed. Five fluidized beds A1, A2, A3, A4, A5 are visible in this side view, with lower numbers being upstream of higher numbers. A first heating surface is located in the first fluidized bed. A second heating surface is located in the second fluidized bed. As illustrated here, those heating surfaces are surfaces of one or more fluid transport conduits 300 that may contain one or more working fluids. Such conduits may be, for example, pipes, tubes, plates, etc.

A means 156 for metering the heated solid particles is located between the heated solids storage tank and the fluidized bed heat exchanger. The means for metering the heated solid particles should be able to accommodate the maximum temperature of the heated solid particles. As illustrated here, the means for metering the heated solid particles is an L-valve. Other metering means include a conical valve.

When the heated solid particles flow by gravity, a malfunction in the feed system could potentially result in flooding of the fluidized bed heat exchanger 150 with the heated solid particles. To prevent such an occurrence, the fluidized bed heat exchanger 150 may include a safety chamber 158 between the heated solids storage tank 140 and the fluidized bed heat exchanger 150. The solid particles can only pass through the safety chamber when they are in a fluidized state. Otherwise, the solid particles will passively stop flowing and the solid particles further upstream will remain in the heated solids storage tank. The safety chamber 158 is separated from the fluidized bed heat exchanger 150 by a wall 159. The wall 159 may be similar in construction to baffles 210 (described below) in that it allows for solid particles to pass therethrough. As illustrated here, air is provided through aeration tube 202 to transport the particles through the L-valve 156 into the safety chamber 158. The safety chamber 158 also includes a fluidized bed 186 and valve; however, no heating surface is present. The size of the safety chamber is minimized to decrease heat losses in this section.

Fluidization in a fluidized bed is achieved by flowing gas upwards through a bed of solid particles. At high enough gas velocities, the gas/solids mass exhibits liquid like properties. A fan 200 is shown here to provide the air flow to each fluidized bed. Each fluidized bed has its own valve 170 to control the air flow, windbox 172, and distributor 174 for promoting even air flow through the bed. The heated solid particles are the solids for the fluidized bed.

It is contemplated that the fluidized beds of the fluidized bed heat exchanger are operated as low-velocity bubbling fluidized beds (BFBs). Each fluidized bed will have a bed surface 204 with a bed height 205 measured relative to the floor 154 of the fluidized bed heat exchanger. The height of the bed can be controlled by the solids discharge rate or it can be set by the height of an overflow baffle (not shown) upstream of the particle exit control means 220.

Figure 3:
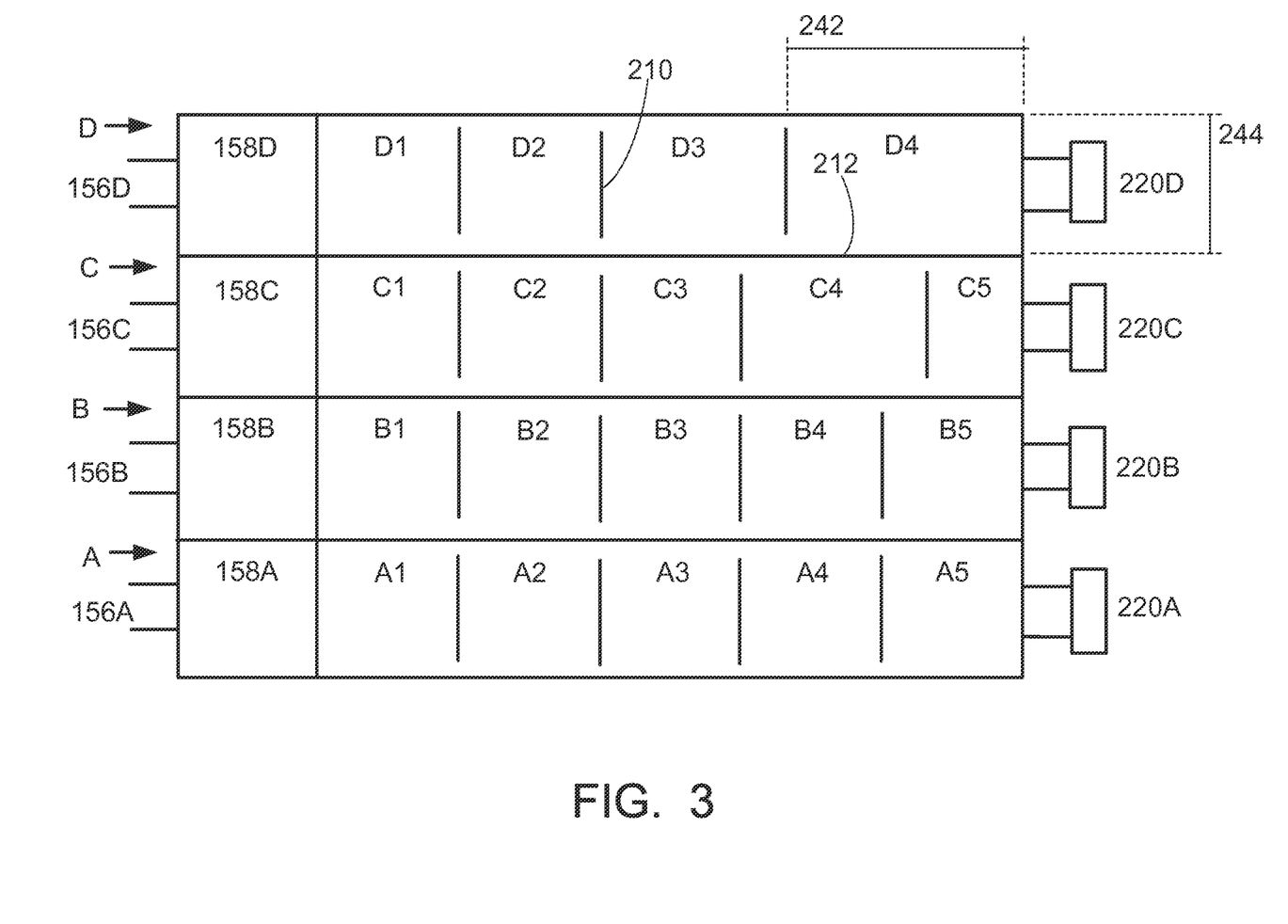
FIG. 3 is a plan view of one possible interior layout for the fluidized bed heat exchanger, showing the fluidized beds with the heating surfaces removed.

As illustrated in FIG. 1, heated solid particles enter from the left and travel to the right through the safety chamber 158 and five different fluidized beds A1, A2, A3, A4, A5 connected in series. (FIG. 3 shows fluidized beds connected in parallel.) The fluidized beds are separated from each other by baffles 210 having a height 211. The height above the bed surface at which particle entrainment becomes approximately constant is known as the transport disengagement height. The transport disengagement height is measured relative to the bed surface 204. The primary factors affecting the transport disengagement height are the particle size distribution, particle density, and the superficial gas velocity.

The freeboard height 209 is the height between the gas exit 155 and the bed surface 204 of the fluidized beds. When the freeboard height 209 is greater than the transport disengaging height 207, the amount of entrained particles that can exit the fluidized bed heat exchanger is minimized.

Located within each fluidized bed is a heating surface. As illustrated here, the heating surface is the surface of a fluid transport conduit 300 containing one or more working fluids. It is contemplated that the fluid transport conduit is located above the floor 154 of the fluidized bed heat exchanger, permitting the fluid transport conduit to be completely surrounded by the heated solid particles. Heat is transferred from the heated solid particles 104 to the working fluids located on the opposite side of the heating surface 300 (i.e. the fluid transport conduit).

The first fluidized bed and the second fluidized bed may either be in series with each other, or in parallel to each other. Directing heated solid particles in a countercurrent flow to the heating surface (i.e. fluid transport conduits containing working fluid) increases the overall mean temperature differential between the solid particles and the working fluid on the opposite side of the heating surface, allowing the total heating surface area to be reduced for a given amount of heat transfer. Countercurrent flow is possible in a structure where the fluid transport conduits are parallel to the heated particle flow through the first fluidized bed and the second fluidized bed. As illustrated in FIG. 1, the first fluidized bed may be considered to be bed A1, with the portion of the fluid transport conduit in this bed being considered the first heating surface 302, and the second fluidized bed may be considered to be bed A2, with the portion of the fluid transport conduit in this bed being considered the second heating surface 304.

The fluidized beds are separated by baffles 210. The baffle restricts mixing of the solid particles between beds, thus maintaining the temperature difference between adjacent fluidized beds and resulting in a stepwise temperature decline from the first bed to the last bed in a given flow stream. The use of baffles maximizes the average solids temperature in the fluidized bed heat exchanger for a given temperature of the solids exiting the fluidized bed heat exchanger. Without baffles, the solids temperature throughout the fluidized bed heat exchanger would be near-uniform due to high mixing rates, and would thus need to be close to the solids exit temperature. The baffles are a surface having openings through which the solid particles can travel. The openings may be located anywhere on the surface of the baffle, such as the bottom, the top, the sides, in the middle, or combinations thereof. The size of the openings is adapted to adequately restrict undesired solids mixing while permitting required solids directional throughput.

Splitting the flow of the heated solid particles into parallel streams allows for tighter match of the particle flow and the fluid flow, thus reducing the margin between the average and maximum upset temperatures of the fluid. In addition, splitting the flow of solid particles in parallel can be useful in controlling the total amount of energy transferred to the fluid, for example when the fluid transport conduits are perpendicular to the heated particles flow through the first fluidized bed and the second fluidized bed (i.e. cross-current flow). This can be useful, for example, in controlling the temperature of superheated steam.

After passing through the fluidized beds, the relatively cooler solid particles exit the fluidized bed heat exchanger 150. The rate of exit can be controlled by a means for controlling particle exit 220. After exiting, the cooler solid particles are transported from the fluidized bed heat exchanger 150 to the cold solids storage tank 110. It should be noted that the cold solids storage tank is elevated relative to the fluidized bed heat exchanger, so the particles are transported against gravity. A means for transporting solid particles 230 is provided to accomplish this task.

The means for transporting solid particles can be any suitable device. For example, the means for transporting solid particles may be a mechanical carrier, such as a conveyor belt, a bucket conveyor, or an Archimedean screw. The means for transporting solid particles could also use a pneumatic carrier, which uses a gaseous carrier (such as air provided by a fan) to lift the solid particles upwards. In some embodiments, the means for transporting is gravity.

The fluidizing medium traveling through the fluidized beds also absorbs heat from the heated solid particles. The heat in the fluidizing medium can be captured in a gas-cooling heat exchanger 240 for use, and/or the fluidizing medium can be recycled to the fluidized beds through the fan 200. In this regard, the fluidized bed heat exchanger includes a housing 152 that covers the fluidized beds. The heated fluidizing medium 370 can thus be channeled to a gas exit 155 that leads to the heat exchanger 240 or fan 200.

As illustrated in FIG. 1, the cooled fluidizing medium after the gas cooler 240 can also be sent to a particulate collection device 250 in which any remaining entrained particles (e.g. fines) are separated from the fluidizing medium. For example, the particulate collection device can be a baghouse or an electrostatic precipitator. Different types of baghouses are known in the art, for example a reverse gas fabric filter, a shake deflate fabric filter, and a pulse jet fabric filter. The cleaned fluidizing medium can then be sent to a stack 260 for venting to atmosphere. The particles collected in the particulate collection device may be discarded (reference numeral 252), or alternatively can be recycled back to the cold solids storage tank 110 (recycling path not illustrated).

FIG. 2 is a schematic diagram showing a side view of a second exemplary embodiment of the solar power system. This embodiment is similar to that depicted in FIG. 1, and shows some additional components that can be used if desired.

The size and the weight of the cooled solids storage tank 110 as depicted in FIG. 1 can be significant, and placing the storage tank at the top of the system increases the structural support requirements, which can result in substantial added cost. Thus in some embodiments as illustrated here, an intermediate storage tank 270 is provided. The intermediate storage tank 270 is downstream of the fluidized bed heat exchanger 150 and upstream of the means for transporting solid particles 230. Preferably, solids transport from the fluidized bed heat exchanger to the intermediate storage tank is accomplished by gravity. Thus, the intermediate storage tank may be at the same elevation as, or at a lower elevation than, the fluidized bed heat exchanger. It is contemplated that generally the intermediate storage tank 270 will have a greater volume than the cold solids storage tank 110. The capacity of the cold solids storage tank would be that required to expeditiously match the solids flow rate through the solar receiver 130 with the solar activity.

The means for transporting solid particles is illustrated in FIG. 2 as being a pneumatic transport means 232. Gaseous carrier is provided by the fan 200 and controlled by valve 234 to transport the solid particles to a higher elevation. At the higher elevation, the gaseous carrier (e.g. air) and the particles travel to a separator 236. The particles then flow to the cold solids storage tank (arrow 237). The gaseous carrier is recycled (arrow 239). Here the gaseous carrier is depicted as being recycled upstream of the heat exchanger 240, but could be recycled downstream of the heat exchanger 240 and upstream of the particulate collection device 250 (if present). Alternatively, the gaseous carrier flow could simply be discharged into atmosphere, and the fan 200 could supply ambient air as the fluidizing and aerating mediums and the gaseous carrier. Separate fans are contemplated as well for supplying aerating medium, fluidizing medium to the heat exchanger 150, and gaseous carrier for the pneumatic transport means 232

Referring now to FIG. 1 and FIG. 2, a preferred method of operation of the system according to the present disclosure is as follows. Solid particles from the cold solids storage tank 110 are metered by means 120 to certain areas of the solar receiver 130 (each area being served by dedicated means) to achieve maximum allowable solids temperature leaving each area. This permits maximizing the temperature of the stored heated solid particles providing maximum efficiency and stability of operation (due to uniformity of the temperature throughout the heated solids storage tank 140).

Solid particles from the heated solids storage tank 140 are metered by the means 156 through the safety section 158 to parallel solid flow streams (see FIG. 3), each parallel flow stream being controlled separately. Within each flow stream, the solid particles flow through a series of connected fluidized beds, and the heat is transferred from the solids to the working fluid in the heating surface (not illustrated) in each bed. Each downstream fluidized bed contains a heating surface with a working fluid whose temperature is lower than that of the working fluid in the upstream fluidized bed. Such an arrangement allows maximizing overall temperature differential between the solid particles and the working fluid, resulting in less required surface for a given heat duty.

The heat duty of each flow stream will be set by the power demand to the system, and controlled preferably by metering the quantity of solid particles into the flow stream. Using a spray of colder fluid into the working fluid and adjusting the superficial velocity of the fluidizing medium in the fluidizing bed can be used as secondary control means.

Cooled solid particles leaving the heat exchanger 150 are stored in an intermediate storage tank 270 from where they are transported to the cold solids storage tank 110. The rate of this transport should be sufficient for maintaining the storage tank 110 full within preset margins.

Fine solids resulting from attrition of the bed material are entrained by the fluidizing and aerating mediums (and gaseous carrier if applicable), collected by the means 250 and disposed of. Fresh particulate material to replenish the lost solid particles inventory can be fed into the intermediate storage tank 270 or the cold solids storage tank 110.

It should be noted that the solar receiver and the fluidized bed heat exchanger can be physically separated from each other by a great distance. In addition, the fluidized bed heat exchanger does not need to be above ground, and could be buried.

FIG. 3 is a plan view (i.e. from the top) of one exemplary embodiment of the interior of the fluidized bed heat exchanger, showing the fluidized beds and with the heating surfaces removed. As illustrated here, the fluidized bed heat exchanger includes four particle flow streams A, B, C, D in parallel with each other. The L-valve 156 and safety chamber 158 for each stream is located on the left, and the means for controlling particle exit 220 for each stream is located on the right. The parallel streams can be fed from one common heated solids storage tank, or multiple heated solids storage tanks may be present. The exit streams can all feed into one means for transporting solid particles, or multiple transport means may be present. The parallel streams are separated from each other by walls 212.

Each flow stream has a plurality of fluidized beds in series. The number of fluidized beds in each flow stream can vary. For example, the first flow stream includes four fluidized beds D1-D4, while the other flow streams include five fluidized beds A1-A5, B1-B5, C1-C5. The dimensions of each fluidized bed may vary as desired. For example, the last fluidized bed D4 in the first flow stream has a greater length 242 than the other fluidized beds. The width 244 of each flow stream may also vary as desired.

FIG. 4 is a plan view (i.e. from the top) of the interior of the fluidized bed heat exchanger of FIG. 3, showing the heating surfaces. Each fluidized bed contains a heating surface for one given working fluid. As illustrated here, each flow stream A, B, C, D includes a fluid transport conduit 300, 310, 320, 330 (in dotted line) that provides the heating surface for each fluidized bed in that flow stream. A working fluid flows through the fluid transport conduit and is heated by the heated solid particles. As illustrated here, the working fluid (arrow 340) would flow countercurrent to the heated solid particles (arrow 350). For example, the fluid transport conduit 330 in the first flow stream D enters into fluidized bed D4 from the side 160 of the fluidized bed heat exchanger, although entry could also be made through the exit end 162 of the fluidized bed heat exchanger. The fluid transport conduit 330 then passes through fluidized beds D3 and D2, and exits from fluidized bed D1 through the side 160. The fluid transport conduits do not pass through the safety chambers 158. The fluid transport conduit 320 in the middle flow stream C enters fluidized bed C5 from the exit end 162 of the fluidized bed heat exchanger and passes through fluidized beds C4, C3, C2, and C1. To avoid passing through the fluidized bed D1 in the first flow stream, it is contemplated that the fluid transport conduit 320 could be raised over the fluidized bed D1 and exit through the side 160 of the fluidized bed heat exchanger (illustrated with dashed line 322).

It should be noted that although only one fluid transport conduit is illustrated here in each fluidized bed, it is contemplated that multiple fluid transport conduits could flow through each fluidized bed, as long as the same working fluid is flowing through a given fluidized bed. For example, a given fluidized bed is used only for superheating steam, rather than being used for both superheating steam and heating air. If heating surfaces of different types (e.g. superheat, reheat, economizer, etc.) are located in the same fluidized bed, controlling the heat absorption of one type might adversely affect the other.

As previously described, the fluidized bed heat exchanger includes at least a first fluidized bed and the second fluidized bed. The first fluidized bed and the second fluidized bed are parallel to each other when located in different particle flow streams (e.g. C1 and D1). Put another way, the first heating surface and the second heating surface are provided by different fluid transport conduits when the first fluidized bed and the second fluidized bed are in parallel. The first fluidized bed and the second fluidized bed are in series with each other when located in the same particle flow stream (e.g. C1 and C2). Put another way, the same fluid transport conduit 300 provides both the first heating surface 302 and the second heating surface 304 when the first fluidized bed and the second fluidized bed are in series.

Figure 5:
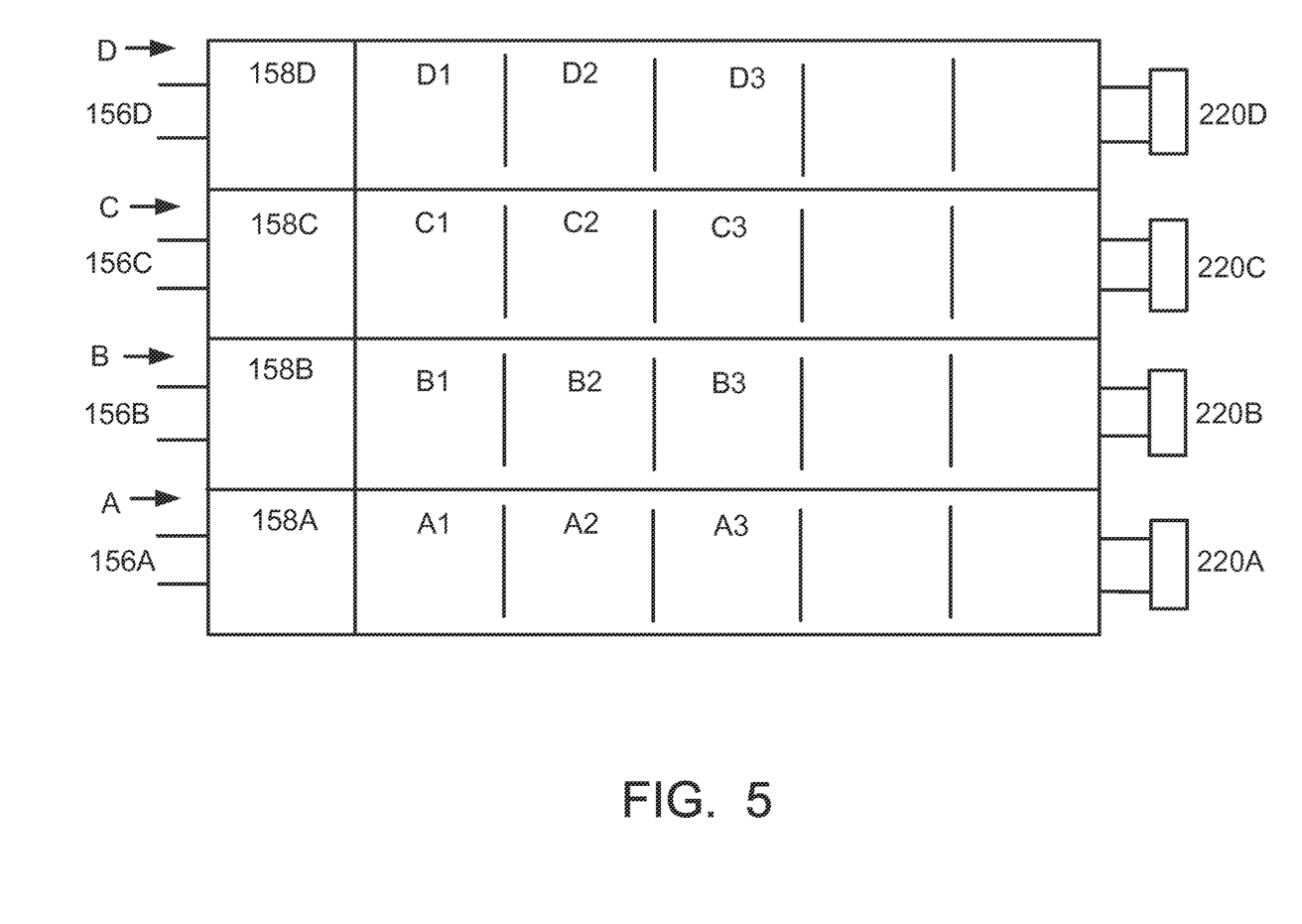
FIG. 5 is a plan view of another possible interior layout for the fluidized bed heat exchanger, showing the fluidized beds with the heating surfaces removed.
Figure 6:
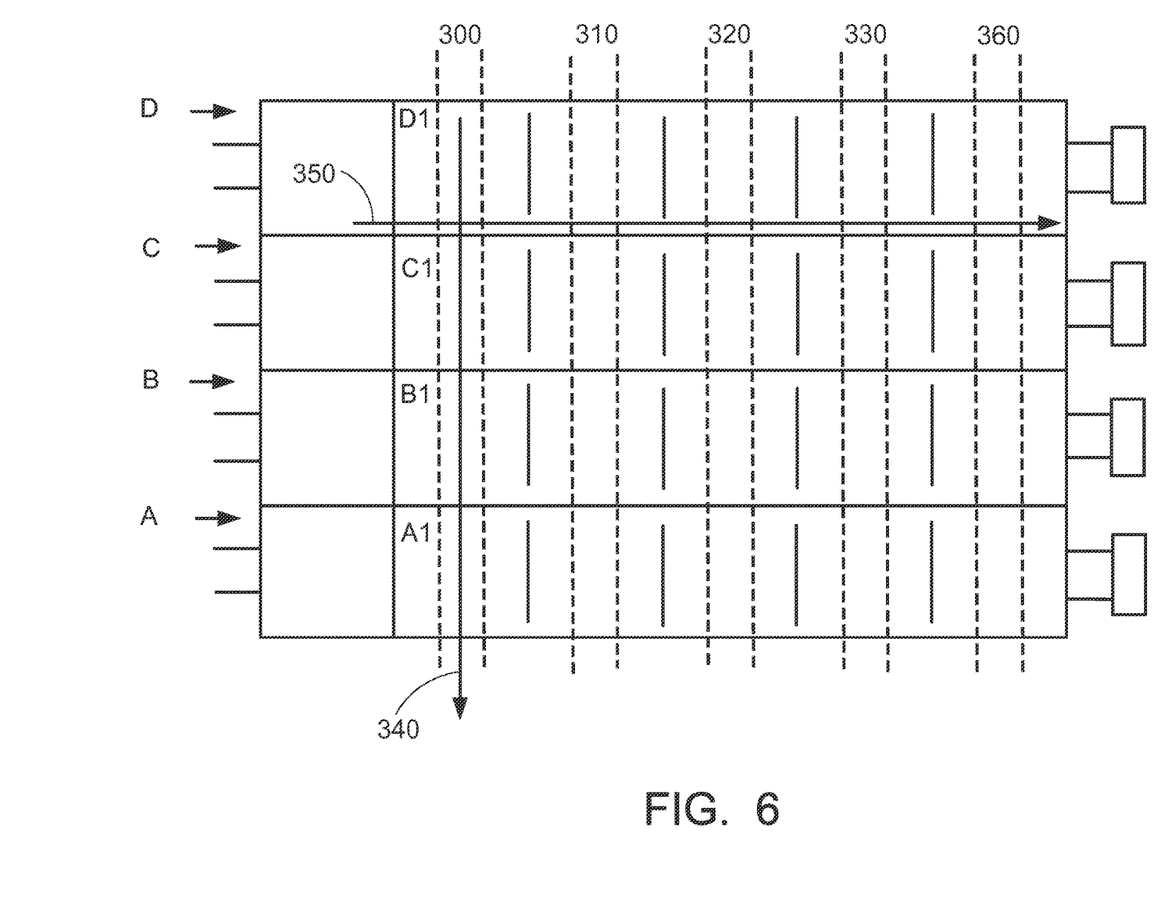
FIG. 6 is a plan view of the interior layout of FIG. 5, with the heating surfaces (tubes) included to show cross-current flow.

FIG. 5 is a plan view of another exemplary embodiment of the interior of the fluidized bed heat exchanger, showing the fluidized beds and with the heating surfaces removed. Note that not all fluidized beds are labeled. FIG. 6 is a plan view of the interior of the fluidized bed heat exchanger of FIG. 5, showing the heating surfaces. The fluid transport conduits are shown in dotted line.

In this embodiment, there are again four parallel flow streams A, B, C, D. Each flow stream has the same number of fluidized beds. Fluidized beds in the same position (i.e. first, second, third) in the parallel flow streams have the same length. For example, fluidized beds A1, B1, C1, D1 have the same length. Again, each fluidized bed includes a heating surface. Here, the fluidized beds in the same position in the parallel flow streams share a fluid transport conduit that provides a common heating surface. For example, the heating surface in beds A1, B1, C1, D1 is provided by fluid transport conduit 300. As illustrated here, the working fluid (arrow 340) would flow cross-current to the heated solid particles (arrow 350). Each fluid transport conduit can carry different fluids to serve different functions. For example, fluid transport conduit 300 may serve as a superheater, fluid transport conduit 310 may serve as a reheater, fluid transport conduit 320 may serve to generate steam, fluid transport conduit 330 may act as an economizer to heat the water, and fluid transport conduit 360 may be used to heat air fed to the primary or secondary burner of an associated boiler (not illustrated).

During operation, heat is transferred from the heated solid particles to the heating surface in the fluidized bed. Each downstream bed will have an operating temperature lower than that of the adjacent upstream bed. The heat duty of each parallel flow stream will be set by the power demand to the system. The heat duty can be controlled by changing the flow rate of the heated solid particles into the flow stream, or by attemperation into the heated particles, or by adjusting the superficial velocity of the bed.

One advantage of the solar power system is the ability to store both heated solid particles and cold/cooled solid particles. The ability to store heated particles creates a buffer that permits the fluidized bed heat exchanger to maintain a constant energy output as solar activity changes over time (e.g. day to night). This ability also permits the solids flow through the various components of the system to be decoupled from each other, so that the flow rate through the different components of the system can differ. For example, when the solar activity changes, the temperature of solid particles leaving the solar receiver is immediately affected. In such circumstances, it would be preferable to reduce solids flow rate through the solar receiver so that the average temperature of the heated solids storage tank remains high, and future system output and efficiency is not reduced.

The solar power system includes several means for solid particle flow metering or control. Each of these means for metering or control could be mechanical or non-mechanical. Examples of mechanical meters include a conical valve, a rotary valve, a gate valve, a check valve, a ball valve, a butterfly valve, etc. Examples of non-mechanical meters include an L-valve and a J-valve. A rotary valve is illustrated in FIG. 1 (reference numeral 120). An L-valve is also illustrated in FIG. 1 (reference numeral 156).

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A concentrated solar power solids-based system, comprising:
   a solar receiver;
   a heated solids storage tank downstream of and connected to the solar receiver;
   a fluidized bed heat exchanger downstream of the heated solids storage tank;
   means for feeding heated solid particles from the heated solids storage tank to the fluidized bed heat exchanger;
   means for transporting solid particles from the fluidized bed heat exchanger to a cold solids storage tank that is located downstream of the fluidized bed heat exchanger; and
   means for transporting and metering cold solid particles from the cold solids storage tank to the solar receiver;
   wherein the fluidized bed heat exchanger includes at least a first fluidized bed, a first heating surface located in the first fluidized bed, a second fluidized bed, and a second heating surface located in the second fluidized bed; and
   wherein the system is further defined by at least one of the following in order to reduce the margin between average and maximum upset temperatures in each fluidized bed:
   (i) fluidizing medium flows to the first fluidized bed and the second fluidized bed can be independently controlled; and
   (ii) the first fluidized bed and the second fluidized bed are located in parallel particle flow streams within the fluidized bed heat exchanger.

2. The solar power system of claim 1, wherein the solar receiver includes a plurality of heating areas that can receive cold solid particles separately from the cold solids storage tank to the solar receiver.

3. The solar power system of claim 1, wherein a freeboard height of each fluidized bed is not less than a transport disengaging height of each fluidized bed.

4. The solar power system of claim 1, wherein the first heating surface and the second heating surface are part of one or more fluid transport conduits, and the fluid flowing through the one or more fluid transport conduits is independently selected from water, steam, a steam-water mixture, air, carbon dioxide, helium, and nitrogen.

5. The solar power system of claim 1, wherein solid particles can travel through the solar receiver and through the heated solids storage tank to the fluidized bed heat exchanger by gravity.

6. The solar power system of claim 1, wherein the means for feeding heated solid particles from the heated solids storage tank to the fluidized bed heat exchanger is non-mechanical.

7. A concentrated solar power solids-based system, comprising:
a solar receiver;
a heated solids storage tank downstream of and connected to the solar receiver;
a fluidized bed heat exchanger downstream of the heated solids storage tank;
means for feeding heated solid particles from the heated solids storage tank to the fluidized bed heat exchanger;
means for transporting solid particles from the fluidized bed heat exchanger to a cold solids storage tank that is located downstream of the fluidized bed heat exchanger; and
means for transporting and metering cold solid particles from the cold solids storage tank to the solar receiver;
wherein the fluidized bed heat exchanger includes at least a first fluidized bed, a first heating surface located in the first fluidized bed, a second fluidized bed, and a second heating surface located in the second fluidized bed; and
wherein the means for feeding heated solid particles from the heated solids storage tank to the fluidized bed heat exchanger includes a safety chamber, wherein solid particles can only pass through the safety chamber when in a fluidized state.

8. The solar power system of claim 1, wherein the means for transporting solid particles from the fluidized bed heat exchanger to the cold solids storage tank is a mechanical carrier.

9. The solar power system of claim 1, wherein the means for transporting solid particles from the fluidized bed heat exchanger to the cold solids storage tank comprises a pneumatic transport means that uses a gaseous carrier for lifting solid particles to the cold solids storage tank.

10. The solar power system of claim 9, wherein the pneumatic transport means includes a separator located above the cold solids storage tank to separate the gaseous carrier from the solid particles, the solid particles traveling by gravity from the separator to the cold solids storage tank.

11. The solar power system of claim 1, further comprising an intermediate storage tank downstream of the fluidized bed heat exchanger and upstream of the means for transporting solid particles from the fluidized bed heat exchanger to the cold solids storage tank.

12. The solar power system of claim 11, wherein the solid particles are transported from the fluidized bed heat exchanger to the intermediate storage tank by gravity.

13. The solar power system of claim 1, wherein the first heating surface and the second heating surface are part of one common fluid transport conduit, or wherein the first heating surface and the second heating surface are part of two different fluid transport conduits.

14. A method of heating a working fluid using solar energy, comprising:
passing cold particles through a solar receiver by gravity to capture solar energy and obtain heated particles, the heated particles traveling by gravity into and through a heated solids storage tank;
sending the heated particles from the heated solids storage tank to a fluidized bed heat exchanger;
fluidizing the heated particles and sending the fluidized particles to at least a first fluidized bed and a second fluidized bed;
transferring heat from the fluidized particles in the first fluidized bed to a working fluid on the opposite side of a first heating surface located in the first fluidized bed and obtaining cooled particles;
transferring heat from the fluidized particles in the second fluidized bed to a working fluid on the opposite side of a second heating surface located in the second fluidized bed and obtaining cooled particles; and
transporting the cooled particles to a cold solids storage tank downstream of the fluidized bed heat exchanger and connected to the solar receiver;
wherein the method is further defined by at least one of the following in order to reduce the margin between average and maximum upset temperatures in each fluidized bed:
(i) fluidizing medium flows to the first fluidized bed and the second fluidized bed are independently controlled; and
(ii) the first fluidized bed and the second fluidized bed are located in parallel particle flow streams within the fluidized bed heat exchanger.

15. A method of heating a working fluid using solar energy, comprising:
passing cold particles through a solar receiver by gravity to capture solar energy and obtain heated particles, the heated particles traveling by gravity into and through a heated solids storage tank;
sending the heated particles from the heated solids storage tank to a fluidized bed heat exchanger;
fluidizing the heated particles and sending the fluidized particles to at least a first fluidized bed and a second fluidized bed;
transferring heat from the fluidized particles in the first fluidized bed to a working fluid on the opposite side of a first heating surface located in the first fluidized bed and obtaining cooled particles;
transferring heat from the fluidized particles in the second fluidized bed to a working fluid on the opposite side of a second heating surface located in the second fluidized bed and obtaining cooled particles; and
transporting the cooled particles to a cold solids storage tank downstream of the fluidized bed heat exchanger and connected to the solar receiver; and
wherein the heated particles from the heated solids storage tank enter a safety chamber prior to entering one of the fluidized beds, wherein the heated particles can only pass through the safety chamber when in a fluidized state.

16. The method of claim 14, wherein the cooled particles travel through an intermediate storage tank downstream of the fluidized bed heat exchanger prior to being transported to the cold solids storage tank.

17. The method of claim 14, wherein the cooled particles travel from the fluidized bed heat exchanger to the cold solids storage tank via a pneumatic transport means that uses a gaseous carrier for lifting the cooled particles to a separator located above the cold solids storage tank, wherein the gaseous carrier is separated from the cooled particles, the cooled particles traveling by gravity from the separator to the cold solids storage tank.

* * * * *